(12) United States Patent
Chenier et al.

(10) Patent No.: US 6,187,123 B1
(45) Date of Patent: Feb. 13, 2001

(54) METHOD FOR PRODUCING A LIGHTENED SIC SANDWICH TYPE STRUCTURE WITH A HONEYCOMB-SHAPED CORE AND STRUCTURE OBTAINED BY SAID METHOD

(75) Inventors: Jean-Pascal Chenier, Le Taillan Medoc; Gérard Rousseau, Saint Aubin de Medoc; Frédéric Boursereau, Le Bouscat, all of (FR)

(73) Assignee: Aerospatiale Societe Nationale Industrielle, Paris, Cedex (FR)

( * ) Notice: Under 35 U.S.C. 154(b), the term of this patent shall be extended for 0 days.

(21) Appl. No.: 09/176,915

(22) Filed: Oct. 22, 1998

Related U.S. Application Data

(63) Continuation of application No. 08/623,006, filed on Mar. 28, 1996, now abandoned.

(30) Foreign Application Priority Data

Mar. 29, 1995 (FR) .................................. 95 03984

(51) Int. Cl.$^7$ ............................. C04B 35/56; B32B 1/08
(52) U.S. Cl. .......................................... 156/89.22; 264/60
(58) Field of Search ................................ 156/292, 89.22; 428/116, 118; 181/292; 264/60

(56) References Cited

U.S. PATENT DOCUMENTS

| | | | |
|---|---|---|---|
| 3,166,149 | 1/1965 | Hulse et al. | 181/292 |
| 3,439,774 | 4/1969 | Callaway et al. | 181/222 |
| 4,067,955 | * 1/1978 | Noakes et al. | 423/345 |
| 4,195,049 | * 3/1980 | Noakes et al. | 264/63 |
| 4,300,978 | 11/1981 | Whitemore et al. | 156/581 |
| 4,379,191 | 4/1983 | Beggs et al. | 428/118 |
| 4,384,020 | 5/1983 | Beggs et al. | 428/138 |
| 4,671,841 | 6/1987 | Stephens | 156/292 |

(List continued on next page.)

FOREIGN PATENT DOCUMENTS

| | | |
|---|---|---|
| 633 604 | 12/1982 | (CH) . |
| 39 13 255 | 10/1990 | (DE) . |
| 0 201 104 | 11/1986 | (EP) . |
| 0 314 625 | 5/1989 | (EP) . |
| 0 477 505 | 4/1992 | (EP) . |
| 0 543 752 | 5/1993 | (EP) . |
| 2 525 963 | 11/1983 | (FR) . |
| 2609179 | 7/1988 | (FR) . |
| 2630831 | 11/1989 | (FR) . |
| 2710874 | 4/1995 | (FR) . |
| 2 056 367 | 3/1981 | (GB) . |
| 2-080380 | 3/1990 | (JP) . |
| WO 84/04727 | 12/1984 | (WO) . |
| WO 88/07688 | 10/1988 | (WO) . |
| WO 92/12854 | 8/1992 | (WO) . |

Primary Examiner—Francis J. Lorin
(74) Attorney, Agent, or Firm—Young & Thompson

(57) ABSTRACT

The present invention concerns a method for producing a lightened SiC structure, especially for the production of a lightened mirror, with the following stages:

cutting of a preform with a honeycomb-shaped structure whose voiles have an organic matrix and a fibrous reinforcement, pyrolysis of this honeycomb-shaped structural preform so as to solely preserve the carbon, silicidation of the carbon of the preform so as to obtain a microporous SiC core, infiltrating type reinforcement by means of a SiC chemical vapor phase depositing of the voiles of the honeycomb structure of the core, embodiment of a felt sheet and assembling on at least one face of the core of the embodied sheet and densification of this sheet so as to obtain at least one SiC skin on the surface of the core.

The invention also concerns the structure obtained.

20 Claims, 2 Drawing Sheets

U.S. PATENT DOCUMENTS

| | | | |
|---|---|---|---|
| 4,737,327 | * 4/1988 | Hatta et al. | 264/60 |
| 4,789,506 | * 12/1988 | Kasprzyk | 264/25 |
| 4,824,711 | 4/1989 | Cagliostro et al. | 428/116 |
| 4,842,398 | 6/1989 | Ducassou | 359/883 |
| 4,879,152 | 11/1989 | Green | 428/73 |
| 4,973,506 | 11/1990 | Bauer et al. | 428/73 |
| 4,990,391 | 2/1991 | Veta et al. | 428/116 |
| 5,037,498 | 8/1991 | Umeda | 156/307.3 |
| 5,071,685 | * 12/1991 | Kasprzyk | 428/34.1 |
| 5,284,685 | * 2/1994 | Rousseau | 427/574 |

* cited by examiner

METHOD FOR PRODUCING A LIGHTENED SIC SANDWICH TYPE STRUCTURE WITH A HONEYCOMB-SHAPED CORE AND STRUCTURE OBTAINED BY SAID METHOD

CROSS-REFERENCE TO RELATED APPLICATIONS

This application is a continuation of application Ser. No. 08/623,006, filed Mar. 28, 1996 now abandoned.

BACKGROUND OF THE INVENTION

1. Field of the Invention

The present invention concerns a method for producing a ceramic sandwich type honeycomb-shaped structure, especially for large lightened mirrors, as well as the ceramic structure obtained by said method.

2. Description of Background Information

A large number of telescopes have been sent into space and carried by satellites for extremely varied applications. These telescopes have a solid glass mirror so as to withstand the stresses of space, basically mechanical and thermal stresses, while providing the mirror portion with the best possible optical quality so as to obtain extremely high performance.

Glass is well-known for:

its dimensional stability due to its extremely low expansion coefficient,
  its capacity to be cast into a given shape,
  its polishing capacity,
  its mechanical qualities.

Nevertheless, glass does have one drawback which is particularly important for space applications, namely its weight.

Any additional weight requires an additional thrust to be placed into orbit, which leads to significantly increased costs.

Moreover, once in orbit, the weight remains prejudicial as it is necessary to have a power motorization proportional to the weight and it is necessary to combat the focus of inertia, a force which limits accuracy.

In addition, the fragility of glass, especially during mounting but more generally during the various machining phases, is also a serious drawback.

The space industry and connected industries which use the same techniques, especially the aeronautics industry, are seeking a structure which possesses good mechanical characteristics, especially high rigidity, as well as an extremely low coefficient of expansion and being as light as possible.

Moreover, for certain applications, it is essential that the material resist oxidation at extremely high temperatures of about 1600° C. without its mechanical qualities being significantly altered at these temperatures.

Silicon carbide, SiC, is one of several high performance materials having properties compatible with these strict and highly specific specifications since its density is low, d=3.25, its longitudinal elasticity module is high, E=600 Gpa, its coefficient of thermal expansion is low $\alpha=4.10^{-6\circ}$ $C.^{-1}$, and its coefficient of thermal conduction is sufficiently high for the applications envisaged, $\lambda=200$ W/m.° K.

Moreover, SiC is insensitive to radiations emitted in a synchrotron, a cyclotron or in high power lasers by virtue of its low atomic number, although it can be used in these applications as a deviation mirror.

Other applications may be possible with this SiC-based ceramic. The method includes applications involving not only extremely lightened mirrors with high dimensional stability, but also thermal screens for aircraft, aircraft fire protective screens, thermic exchangers or catalyst supports.

It is also known that in cryogenic optical systems, the thermic mass effect is reduced by the use of SiC with the result of facilitating cooling of the mirror and maintaining the right temperature.

A large number of techniques have been developed to produce SiC structures, but a large number of difficulties limit the possibilities for lightening the products manufactured. The size and shape are also subjected to production stresses.

WO 88/07688 concerns a lightened mirror made from SiC and a method for producing this mirror.

This particular mirror includes an SiC foam preform made from polyurethane foam cut to the sought-after profile and from which all the heteroatoms are eliminated, except carbon. SiC is then deposited on this preform by any suitable method so as to obtain a monolithic porous block of SiC which is densified by depositing a fine coat of SiC on the surface so as to provide the surface with good adhesion capacity.

The block obtained is machined so as to provide it with surface evenness or the desired curve. The machined faces receive a thin SiC coating by means of chemical vapor deposition. This coating reinforces the mechanical resistance of the block and which may be polished so as to provide the surface with optical qualities.

This block nevertheless exhibits inadequate resistance for certain applications in which the mechanical stresses are high and the dimensions are reduced, with the result that the strength, especially mechanical resistance, of a SiC block with a foam structure is too weak. It is also possible that the penetration of SiC into a thick foam block poses problems.

SUMMARY OF THE INVENTION

The aim of the invention is to provide a method for producing a SiC structure, especially for lightened mirrors including a honeycomb-shaped core, also made of SiC, as well as the structure obtained by this method.

The structure obtained has the shape and dimensions sought-after and possesses extremely high mechanical rigidity, even at high temperatures, and is extremely resistant to oxidation, is lighter and compatible with the applications envisaged, especially airospace applications ones, it can be machined and its faces can receive a coating for being polished to provide optical qualities, and it may also comprise localised inserts so as to receive mounted parts, especially mechanical fixing parts.

To this effect, the invention concerns a method for producing a ceramic SiC structure, especially a lightened mirror, which is characterised by the succession of the following steps:

cutting along the desired profile of a preform of a honeycomb-shaped structure whose cell walls have an organic matrix with a fibrous reinforcement while taking into account any possible shrinkages,
  pyrolysis of this honeycomb structure preform so as to retain solely the carbon whilst keeping the initial profile,
  silicidation of the carbon of the preform so as to obtain a microporous SiC core,
  infiltrating type reinforcement by SiC chemical vapor deposition of the cell walls of the honeycomb structure,
  formulation of a felt type sheet, assembling the sheet on a one face of the core, thus covering the cells and densification of this sheet so as to obtain SiC skins on the surface of the core so as to form a SiC structure.

According to the invention, the embodiment of the sheet, the assembling with covering of the alveoles and densification are carried out by the sequence of the following steps:

placing a tufted felt with short ex-raxon carbon fibers on each of the faces of the core, infiltrating type stiffening and linking of said felt to the cell walls of the cells by means of a SiC chemical vapor deposition, binding by a SiC-based cells so as to reduce porosity on the surface, and infiltrating type chemical vapor deposition of a thin coating of SiC with a slow kinetics phase for densifying the surface coating, and a thicker coating of about hundreds of u during a second phase with faster kinetics.

As part of making the skins, each face of the core is plated with a sufficient pressure on the felt sheet so that the cell walls of the cells pierce the felt to a certain depth, the imprinted sheet being partially housed in the cells by covering them.

According to one variant, the felt is directly embodied in the cells.

According to one variant of making of the ceramic structure, the invention involves the following steps:

making of a SiC felt sheet of whiskers coated with an organic binder with a low voluminal percentage of fibers of about between 5 and 20%, a small quantity of binder between 3 and 15% in weight and a small thickness of about one millimeter, cutting of portions of this felt sheet of whiskers to the profile of the faces of the core with a reinforced honeycomb structure and placing of these cut portions on these faces with a subsequent piercing to imprint the sheet with the core which constitutes a sandwich, baking of the sandwich produced so as to polymerize the organic binder and fix this sandwich in the desired shape, pyrolysis of the sandwich so as to eliminate the organic binder, chemical vapor deposition of SiC with slow kinetics so as to form the skins on the core and a predensification, and chemical vapor deposition of SiC on the skins made of predensified SiC whisker fibers so as to mechanically reinforce and seal the sandwich which results in producing a half-finished product.

More particularly, the felt with whisker fibers with random orientations is obtained by the succession of the following steps:

placing in suspension of SiC whisker fibers in an ethyl alcohol/phenol solution, flocculation by adding water to the solution with continuous agitation of the mixture, and filtering flocks of whisker fibers on a fine mesh screen of so as to obtain a sheet of whisker fibers orientated randomly.

In this case, during filtering, the reinforced honeycomb structure may be placed on the screen so as to embody in situ for the first face solely the felt sheet of whisker fibres directly in the cells, the flocks accumulating in each of said cells.

One polymerization method consists of baking the core and the skins placed in a bladder which is placed in a partial vacuum during polymerization.

The invention also concerns a method for producing a half-finished product fitted with inserts so as to receive a holding device for mounting this half-finished product on a frame on which it is to be mounted by carrying out the following steps:

reinforcement of the honeycomb core in the areas aligned with the attachment points by introducing carbon fibers, by punch cutting a felt made of "ex-rayon" carbon fibers, into the cells aligned with the attachment points; the walls of the cells being used as a punch.

optionally placing of a receiving part aligned with the insert prior to assembling and densification of the skins, stiffening by SiC chemical vapor depositing aligned with reinforced zones, sealing with a SiC-based paste so as to reduce the porosity of the surface of the felt and ensure bonding of the receiving part, and assembling and densification of the skins, machining of the sandwich aligned with the insert for placing of the holding device or for mounting the holding device in the receiving part, chemical vapor deposition of SiC so as to form a sealed skin on the surface of the felt and coat the peripheral zone of the holding device mounted in the insert with a possible prior sealing with the paste.

According to one improved embodiment, the circumference of the product is subjected to chemical vapor deposition of SiC so as to form a sealed reinforced peripheral belt to be used as a fixing support.

The invention also concerns the ceramic half-finished product obtained by implementing the method of the invention which includes a sandwich with a honeycomb core made of SiC and two skins, also made of SiC.

BRIEF DESCRIPTION OF THE DRAWINGS

The method of the invention is described hereafter according to a main embodiment accompanied by its variants with reference to the drawings which illustrate a particular embodiment and embodiment variants, the drawings including:

FIG. 3c is an enlarged view of a portion of FIG. 3b.

DESCRIPTION OF THE PREFERRED EMBODIMENTS

Figure 1A:
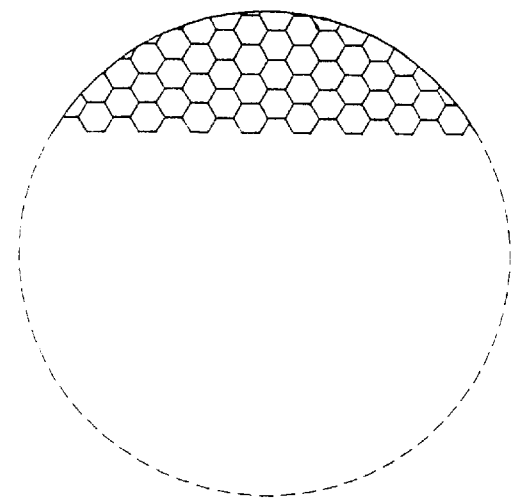
FIGS. 1a to 1e show the various stages involved in producing the core of the invention.
Figure 1B:
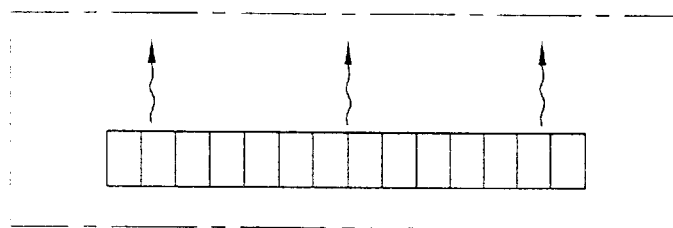
Figure 1C:
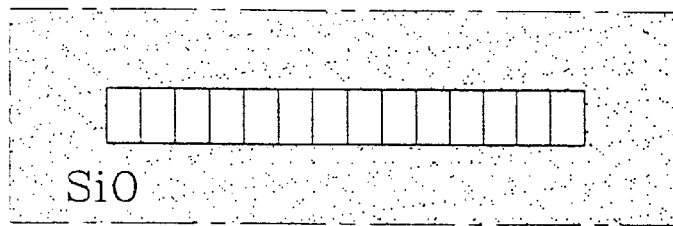
Figure 1D:
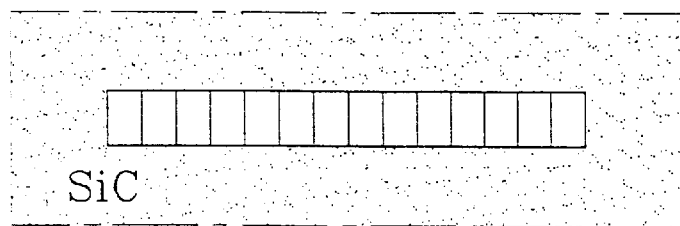
Figure 1E:
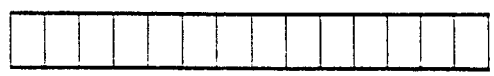
Figure 2:
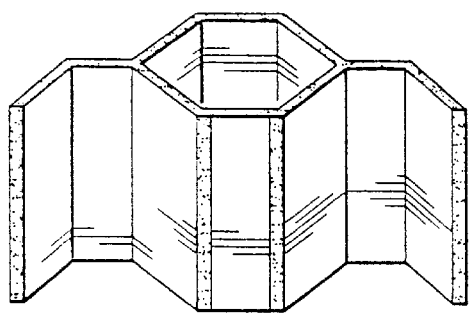
FIG. 2 shows a perspective view of a cut of the core obtained by the method of the invention.

According to the invention, the method for producing a ceramic SiC structure constituting a half-finished product mainly includes the following steps:

1. cutting a desired profile into a support to obtain a preform with a honeycomb-shaped structure whose cells are made of an organic matrix and a fibrous reinforcement while taking into account any possible shrinkages (FIG. 1a);

2. pyrolysis of the preform so as to transform the organic material into carbon (FIG. 1b);

3. high temperature silicidation of the carbon by gaseous silicon monoxide or silicon so as to obtain a SiC core with a honeycomb-shaped structure (FIG. 1c);

4. chemical vapor deposition of dense SiC on the cell walls of the honeycomb structure of the SiC core (FIG. 1d–FIG. 2);

5. producing of SiC skins on the faces of the core (FIG. 1e).

There now follows a description of a particular embodiment of the method of the invention. The following numbers correspond to the steps mentioned above and now given here in detail:

1/ The organic material with a honeycomb structure is a commercial material.

It is possible to select a woven or non-woven aramid fiber composite with a phenol resin matrix or a woven carbon fiber composite with a phenol resin matrix. The material is cut to the shape and dimensions of the structure to be obtained while taking into account any possible shrinkage: this is the preform.

2/ The preform obtained is pyrolyzed under a neutral atmosphere so as to avoid any oxidation at a temperature compatible with the aramid fibers/phenol resin composition, namely of more than 700° C.

During this pyrolysis, so as to avoid any subsequent warping, the preform is supported by a suitable tool so as to preserve the surface evenness of the preform.

The preform has the final shape and dimensions with approximate corrective machinings, as described subsequently.

According to the nature of the composite preform, the core obtained is of the vitreous carbon type when aramid fibers are involved, or of the vitreous carbon matrix/carbon when the initial material includes carbon fibers, as indicated earlier.

3/ The chemical nature of the preform obtained is then modified so as to transform it into SiC.

Known silicidation techniques are used which consist of making the vitreous carbon react with gaseous silicon monoxide (SiO) or silicon (Si) which transforms the vitreous carbon into microporous SiC, the reaction being

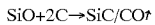

$$SiO+2C \rightarrow SiC/CO\uparrow$$

or

$$Si+C \rightarrow SiC$$

4/ The microporous SiC core with a honeycomb structure is extremely fragile as the porosity percentage of the cells walls of the cells is extremely high.

Chemical vapor deposition of dense SiC approximating nominal density of about d=3.2 on the cell walls makes it possible to reinforce the mechanical characteristics of the SiC core with a honeycomb structure, the deposition resulting more specifically in an infiltration. The thickness of the coat of the deposit, to be described subsequently, is extremely regular and a man skilled in the art, knowing all the dimensional parameters of the honeycomb, would be able to calculate the thickness of the cell walls according to the envisaged application.

The method consists of a cracking, that is a decomposition at a high temperature of between 800 and 1200° C., of the trichlorosilane methyl $CH_3 SiCl_3$ under hydrogen. The conditions, e.g, the temperature, the partial pressures of the existing reactive gases and the overall pressure, the flowrates of the gaseous mixture depend on the dimensions of the structure and according to the dimensions of the pores.

This reinforcement deposit is fully bonded to the core instead of being a mere surface coating so that resistance to thermal impacts and mechanical wear is excellent.

The core as obtained is made of honeycomb SiC, mechanically reinforced.

5/ From this core, a sandwich type structure can now be produced whose mechanical resistance is completely different. This structure includes on the faces of the core two skins made and intimately linked with said core.

Two options are available to form these skins
 a/ from a carbon/SiC composite material, and
 b/ from a SiC/SiC composite material a/ A tufted felt is used from short "ex-rayon" carbon fibers whose coefficient of expansion is close to that of the SiC.

The thickness varies from 1 to 5 mm.

Figure 3A:
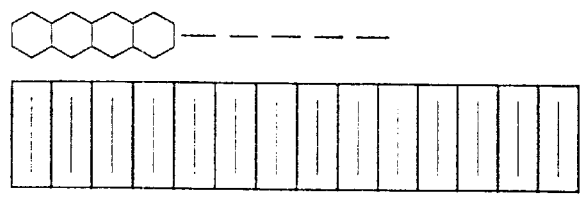
FIGS. 3a and 3b show the two phases of punch imprinting the felt by the core.
Figure 3A:
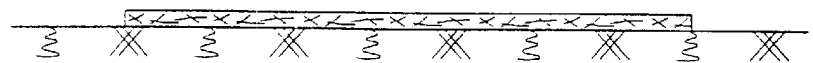
Figure 3B:
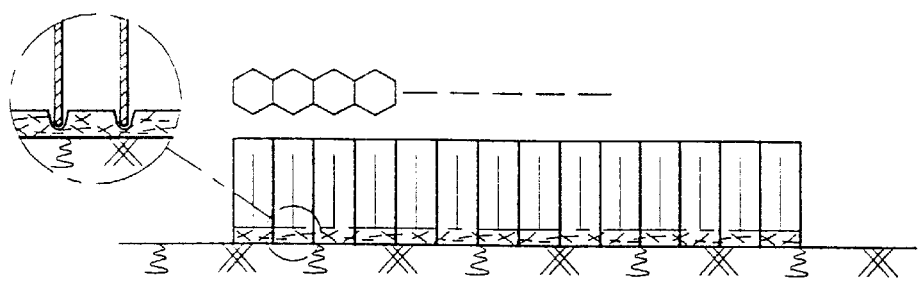

As shown in FIGS. 3a and 3b, the tufted carbon felt is placed on a flat anvil and the mechanically reinforced honeycomb SiC core is used as a punch imprinting the open faces of the cells of the first face orientated opposite said tufted felt (FIG. 3a).

The felt is imprinted when the core is pressed on said felt, each cell marking the felt aligned with the opening of the cell opening onto the first face (FIGS. 3b) and 3c.

The core is turned upside down and a new tufted carbon felt surface is placed and similarly the opening of each cell opening onto the second face is covered.

A new infiltrating type of chemical vapor deposition of SiC is carried out with the approximate adaptations of the parameters to that of step 4 for reinforcing the cell walls.

The coating is extremely thin so as to stiffen the carbon felt and bind it to the cell walls of the cells for the punched portions.

The full faces obtained are coated with a coating of thick paste, SiC powder or SiC whiskers, which reduces the porosity of these full faces.

Chemical vapor deposition is carried out on the two faces. The deposit is initially of the infiltrating type with slow deposit kinetics which densifies the full faces and reduces porosity.

Secondly, the deposit kinetics are accelerated so as to deposit a thick coating of several hundred of $\mu$ of dense SiC which provides the skins obtained with the mechanical resistance required to obtain a SiC half-finished structural product with a SiC honeycomb core and SiC skins and the capacity to receive a polishing.

According to one variant, the tufted carbon fibers felt is embodied in situ directly in the cells of the SiC core with the honeycomb structure with reinforced mechanical resistance. This embodiment is described in the patent FR-A-2.525.963 in the name of the Applicant, it being recommended to consult said patent to obtain more details concerning implementation.

The paste sealing operations and the following operations remain unchanged.

b/ Embodiment of a SiC/SiC composite material.

The whisker fibers used for this preferred embodiment are SiC monocrystals with a length varying from 10 $\mu$ to 1000 $\mu$ and a diameter of between 0.1 and 5 $\mu$. These whisker fibers are suspended in a solution of ethyl alcohol with the phenol resin of the liquid resol type.

The percentage of whiskers needs to remain low so as to obtain a good dispersion of the whiskers, this percentage being less than 10% and preferably 5%.

Water is added so as to carry out a flocculation.

A powerful mechanical agitation avoids any reagglomeration.

The resin particles are bonded to the whisker fibres and the fibres become bonded together so as to form, via flocculation under the effect of the added water, a small core of whisker fibers orientated randomly, that is, flocks.

A filtering under vacuum allows the solution to pass and retains the flocks of whisker fibers of this suspension which form on the surface of the screen a felt sheet with fibers orientated randomly with a regular thickness to the three dimensions of the profile of the screen.

The volume percentage of the whisker fibers is between 5 and 20% and thickness is about 1 mm.

The quantity of resin fixed to the whisker fibers depends on the initial resin percentage and the quantity of water added for flocculation.

The felt sheets are cut when humid into pieces having the shape of each of the faces of the honeycomb SiC core with reinforced cell walls.

The core is plated on the corresponding cut piece by means of pressing so as to imprint the opening structure of the cells of the honeycomb; the piece is thus fixed to the core.

The core is turned upside down with its first skin and the procedure is as above, the two faces of the core thus being covered so as to form the skins.

The core and the two skins positioned as above are placed in a flexible bladder able to placed in a partial vacuum having the effect of keeping the skins plated on the core. The baking of the bladder containing the core and skins at a temperature of about 170° C. for the phenol resin allows polymerization of the resin which links the whisker fibres of the felt, thus ensuring a mechanical cohesion of the fibres and the linking of each of the skins to the core, which fixes the geometry of the core/skins sandwich. After removing the sandwich from the bladder, pyrolysis of the sandwich at 900° C. under a neutral atmosphere transforms the phenol resin into vitreous carbon.

The felt skins of SiC whisker fibers constitute an extremely thick porous substrate with a large specific area which is densified by a chemical vapor deposition of SiC.

This operation also ensures the mechanical linking of each of the skins on the honeycomb core with reinforced cell walls.

As a variant, it is also possible to place the honeycomb core on the screen of the filter by making the suspension flow through the honeycomb and the whisker fibers shall accumulate in each cell, which results in producing individual felts per cell for the first face. For the second face, it is necessary to produce a felt independently.

Thus, a half-finished product is obtained ready to be machined and receive additional deposits so as to obtain a functional ceramic structure according to the application, especially for the production of a mirror.

This half-finished product moreover requires fixing/mounting means, especially when the application involves lightened mirrors needed to be secured to a support frame.

First of all, it is necessary to mount inserts, that is, reinforced zones in the honeycomb structure, so that they can receive holding devices to be integral with the frame on which said half-finished product is to be installed To form inserts at the provided fixing points, prior to formation, assembling and densification of the skins, the cells of the honeycomb core are filled with a known type of felt, for example "ex-rayon" carbon felt identical to the one used for the embodiment of the SiC/carbon skin according to step 5a.

This filling is effected by punch cutting a felt sheet, the cell walls of the cells being used as a cutting punch.

During this stage, it is possible to place a piece for subsequently receiving a fixing piece opposite the insert prior to assembling and densification of the skins.

This may be followed by a stiffening by means of chemical vapor deposition of SiC at aligned with the reinforced zones and sealing with a SiC-based paste so as to reduce the porosity of the surface of the felt and ensure bonding of the receiving piece.

Then the skins may be assembled and densified, as described previously.

The sandwich is machined opposite the insert so as to place the fixing piece directly in said insert or the skin alone is machined so as to allow for access to the receiving piece and the mounting of the fixing piece in this receiving piece.

According to requirements, placing may be completed by a chemical vapor deposition of SiC so as to form a sealed skin and in order to coat the peripheral zone of the holding device mounted in the insert with a possible prior sealing with paste.

Finally, so as to ensure a good finishing of the produced ceramic structure, a peripheral belt is formed identical to that of the insert by placing a peripheral tufted felt, followed by stiffening by means of chemical vapor deposition of SiC, which also ensures the bond between the tufted felt belt and the core, preceded by a sealing by a thick paste of SiC whisker fibers or SiC powder followed by the chemical vapor deposition of SiC.

The section of the sandwich is a favored zone for placing inserts as the holding devices are thus situated outside the working faces of the half-finished product.

Of course, this half-finished product may then receive, at least on one of its faces, a finishing coating which, in the case of a mirror, is a material coating, such as SiC which is able to be polished so as to have optical characteristics.

This finishing does not form part of the present invention and thus is not described in detail.

On reading the description, it can be seen that the product obtained satisfies the specifications mentioned in the foreword since the product obtained possesses high dimensional and geometrical stability. Moreover, it possesses extreme mechanical resistance by virtue of its sandwich structure with a honeycomb core. It is possible to provide inserts which solve the problems of mounting on a frame, namely complex problems involving glass mirrors of the prior art, for example. In addition, it is also extremely resistant to abrasion and it retains its properties when it is exposed to high temperatures.

What is claimed is:

1. A method of making a SiC lightened structure comprising:

cutting a honeycomb structure having two faces into a desired shape while taking into account any possible shrinkages, the honeycomb structure having cell walls forming honeycomb cells, the cell walls being composed of an organic matrix and fibrous reinforcement;

pyrolyzing the honeycomb structure to form a preform comprising vitreous carbon;

siliciding the preform so as to transform the vitreous carbon into a microporous SiC honeycomb core;

reinforcing the cell walls of the honeycomb core by chemical vapor deposition of SiC; and assembling a felt sheet on at least one face of the honeycomb core to cover the honeycomb cells, and densifying the felt sheet using SiC to obtain at least one SiC skin on a surface of the honeycomb core so as to form a SiC structure.

2. The method of claim 1, wherein the felt sheet comprises a tufted "ex-rayon" carbon short-fiber sheet, and wherein assembling of the felt sheet and the honeycomb core to cover the honeycomb cells, and the densifying of the sheet further comprises:

placing a felt sheet on each face of the honeycomb core;

stiffening and bonding of the felt sheet to the honeycomb cell walls by infiltrating chemical vapor deposition of SiC;

sealing the felt sheet by coating the felt sheet with SiC-based paste so as to reduce porosity of the felt sheet; and depositing a thin layer of SiC on the felt by infiltrating chemical vapor deposition with a slow kinetics first phase, and then depositing a thicker layer of SiC on the felt with a faster kinetics second phase.

3. The method of claim 2, wherein a thickness of the thicker layer of SiC deposited by the faster kinetics is about hundreds of $\mu$m.

4. The method of claim 2, wherein each face of the honeycomb core is pressed with sufficient pressure onto a felt sheet such that the cell walls punch into the felt sheet to a given depth to imprint the felt sheet and such that the felt sheet partially penetrates into the cells of the honeycomb core, the honeycomb cells thus being covered.

5. The method of claim 2, wherein the felt sheet is placed on the honeycomb core by accumulating a layer of fibers in the honeycomb cells.

6. The method of claim 1, wherein the felt sheet is formed by a SiC whisker felt sheet coated with an organic binder, the felt sheet having a low volume percentage of fibers of about 5 to 20 vol %, the organic binder forming a thin coating having a thickness of about one millimeter and the organic binder being about 3 to 15 wt % of the felt sheet, and cutting the felt sheet into a profile of the honeycomb structure, and wherein assembling of the sheet to cover the cells of the honeycomb core and densification further comprises:

placing the cut felt sheet on a face of the honeycomb core to form a sandwich;

baking the sandwich so as to polymerize the organic binder and to set the sandwich in a desired shape;

pyrolyzing the sandwich to eliminate the organic binder;

depositing SiC on the felt sheet by chemical vapor deposition with slow kinetics to bond the felt sheet to the core and to pre-densify the felt sheet; and depositing a layer of SiC on the felt sheet to seal and mechanically reinforce the sandwich to form a half-finished product.

7. The method of making a SiC lightened structure according to claim 6, wherein after the felt sheet is cut, the placement of the felt sheet comprises punching to imprint the sheet with the core.

8. The method of claim 6, wherein the baking step further comprises placing the honeycomb core and the skins in a bladder which is placed in a partial vacuum during polymerization.

9. The method of claim 6, wherein the half-finished product is used to produce a lightened mirror.

10. The method of claim 6, wherein formation of the whisker fiber felt sheet further comprises:

placing SiC whisker fibers in suspension in a phenol resin/ethyl alcohol solution;

flocculating the suspension by adding water to the solution to form a mixture and by continuously agitating the mixture; and filtering the mixture through a small mesh screen to obtain a sheet of whisker fibers.

11. The method of claim 1, wherein the felt sheet is formed by a SiC whisker felt sheet coated with an organic binder, the felt sheet having a low volume percentage of fibers of about 5 to 20 vol %, the organic binder forming a thin coating having a thickness of about one millimeter and the organic binder being about 3 to 15 wt % of the felt sheet, and wherein assembling of the sheet to cover the cells of the honeycomb core and densification further comprises:

placing the felt sheet on a face of the honeycomb core to form a sandwich;

baking the sandwich so as to polymerize the organic binder and to set the sandwich in a desired shape;

pyrolyzing the sandwich to eliminate the organic binder;

depositing SiC on the felt sheet by chemical vapor deposition with slow kinetics to bond the felt sheet to the core and to pre-densify the felt sheet; and depositing a layer of SiC on the felt sheet to seal and mechanically reinforce the sandwich to form a half-finished product.

12. The method of claim 11, wherein formation of the whisker fiber felt sheet further comprises:

placing SiC whisker fibers in suspension in a phenol resin/ethyl alcohol solution;

flocculating the suspension by adding water to the solution to form a mixture and by continuously agitating the mixture; and filtering the mixture through a small mesh screen to obtain a sheet of whisker fibers.

13. The method of claim 12, wherein the filtering step further comprises placing the honeycomb core on the small mesh screen to accumulate a layer of whisker fibers in the honeycomb cells.

14. The method of claim 1, wherein inserts are formed in the honeycomb core to receive an attachment mechanism which allows the honeycomb structure to be mounted on a frame having attachment points, wherein formation of the inserts comprises:

reinforcing the honeycomb core in at least one area corresponding to the attachment points of the frame by introducing carbon fibers into at least one honeycomb cell in said at least one area such that an insert is formed; and machining the sandwich in said at least one area at the insert to allow attaching the honeycomb structure to the attachment mechanism.

15. The method of claim 14, wherein the introduction of the carbon fibers is accomplished by punch cutting a felt made of "ex-rayon" carbon fibers.

16. The method of claim 14, further comprising, prior to assembling and densifying the skins:

placing a receiving element into the honeycomb structure aligned with the insert, the receiving element for receiving the attachment mechanism;

stiffening the honeycomb structure by depositing SiC by chemical vapor deposition in areas aligned with the insert; and sealing the honeycomb structure with a SiC-based paste to reduce porosity on a surface of the felt sheet and ensure bonding of the receiving element to the honeycomb structure.

17. The method of claim 14, further comprising depositing SiC on the felt sheet by chemical vapor phase deposition to form an impervious skin and to coat a peripheral zone of the attachment mechanism mounted in the insert.

18. The method of claim 17, wherein prior to the formation of the impervious skin and coating of the peripheral zone, the peripheral zone is sealed with paste.

19. The method of claim 1, further comprising a step of adding a finishing coating to at least one of said at least one SiC skin and polishing said finishing coating to produce a lightened mirror.

20. A lightened SiC ceramic structure obtained by the process of claim 1, wherein the structure includes a sandwich with a SiC honeycomb core and two SiC skins.

* * * * *